Aug. 15, 1950      W. C. HAIN      2,518,614
TRAP
Filed Oct. 18, 1944
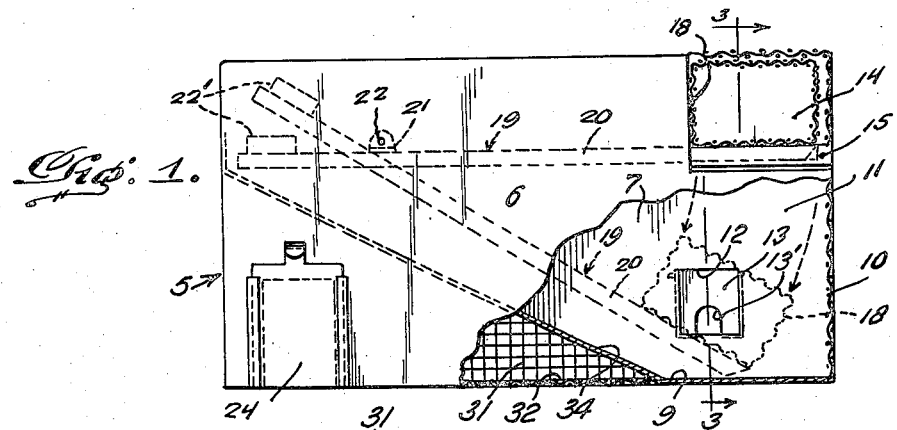
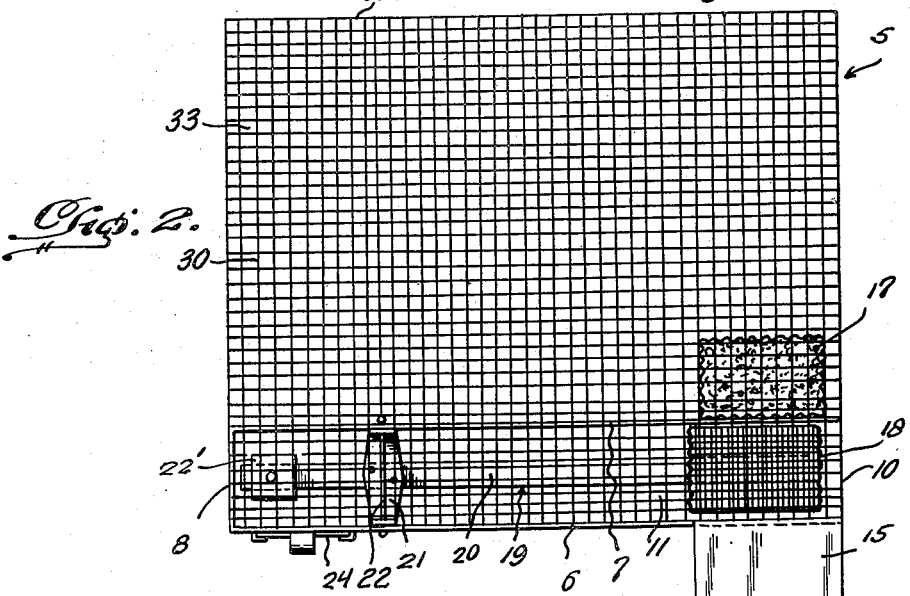
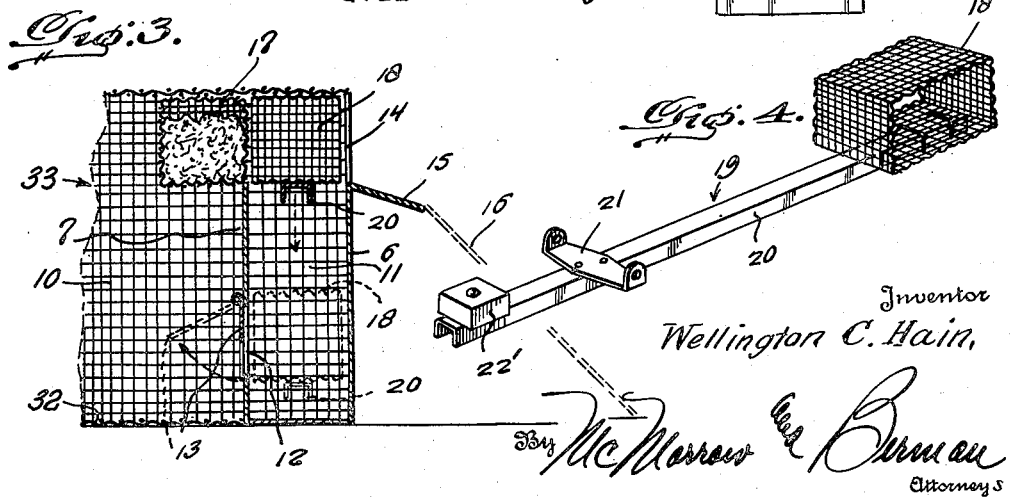
Inventor
Wellington C. Hain,
By McMorrow & Berman
Attorneys Patented Aug. 15, 1950

2,518,614

UNITED STATES PATENT OFFICE 2,518,614

TRAP

Wellington C. Hain, Wichita, Kans.

Application October 18, 1944, Serial No. 559,270

1 Claim. (Cl. 43—68)

This invention relates to a trap especially adapted for catching birds without injury thereto and if desired may be employed for trapping small animals or rodents.

The primary object of the invention is the provision of a device of this character which will be self-setting after the trapping of each bird and makes provision for the substantial confinement of the bird during its travel under its own weight from the entrance opposite to the bait to the entrance of a confining compartment and which is large in size to accommodate comfortably a plurality of birds with freedom of limited flight, so that the birds will not be alarmed and subject themselves to injury during the period of confinement or for such time before they are manually removed from the device.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and the accompanying drawing, in which:

Figure 1 is a front elevation partly in section illustrating a trap constructed in accordance with my invention.

Fig. 2 is a top plan view illustrating the device.

Fig. 3 is a fragmentary sectional view taken on the line 3—3 of Fig. 1.

Fig. 4 is a perspective view illustrating the trigger mechanism apart from the rest of the structure.

Referring specifically to the drawing, wherein like reference characters have been used throughout the several views to designate like parts, 5 indicates generally the trap according to the invention, which comprises a cage or confinement compartment 33 and a trigger chamber 11. The trap 5 is preferably constructed mainly of foraminous material so as to permit the entry of light to the interior, as well as to provide for full and efficient ventilation. The trap 5 comprises a top wall 30, a rear wall 31, a bottom wall 32, opposed side walls 8 and 10 and a front wall 6. The front wall 6 is formed of solid material as shown, but the remaining walls may be formed of foraminous material as shown. The cage or confining compartment 33 is generally rectangular in shape and is separated from the trigger chamber 11 by a wall 7 of solid material and a lower wall 9 which includes an upwardly inclined portion 34 which is likewise of solid material. Thus, the trigger chamber is defined by the wall portions 9 and 34 at the lower part thereof, by the front wall 6, the wall 7, forward portions of the side walls 8 and 10, and a forward portion of the top wall 30. The wall 7 is formed to provide an opening or doorway 12 therein to provide communication with the cage or confinement portion 33. The doorway 12 is normally closed by a gravity actuated door 13 which in turn is provided with a small opening 13' which, as shown, is too small to permit passage of a bird therethrough, or which is barred by spaced pins or rods (not shown) to prevent such passage. Thus, opening 13' permits a bird that may be in the chamber 11 to see into the cage portion 33 and thereby become attracted thereto and attempt to enter such portion 33 through the opening 13'. Such efforts will force the door 13 open and allow the bird to enter the confinement portion 33.

A main entrance 14 is formed in the front wall 6 above the doorway 12 and has associated therewith an outwardly and downwardly inclined sill rest or platform 15 arranged exteriorly of the chamber 11 and on which may rest the upper end of a runway 16 of any conventional construction, Figure 3. Directly opposite the main entrance 14 the wall 7 is provided with an opening in which is situated a foraminous bait chamber 17 so that the bait will be in clear view of a bird standing on the platform 15 before the entrance 14 and thereby be attracted into the entrance. A tubular box-like structure 18 which is open at the front and rear ends normally is interposed between the entrance 14 and bait chamber 17. The structure 18 provides a passage leading to the bait chamber 17. Structure 18 comprises a part of the trigger mechanism which is generally indicated by 19, Figure 4. The box-like structure 18 corresponds substantially to the size of the entrance 14 to permit a bird passing therethrough to enter the passage without hindrance.

The trigger mechanism 19 further includes a bar 20 which has the box-like structure 18 secured thereto and at one end thereof. A bracket 21 is secured on the bar adjacent the latter's other end and has upturned ears apertured to receive a pivot pin 22 carried by the walls 6 and 7 thereby mounting the bar for vertical pivotal movement and with the bar having a greater length at one side of the pivot than at the other side. A counter-balanced weight 22' is secured on the short portion of the bar 20 the purpose of which is to counterbalance the weight of the box-like structure 18 and keep the bar normally in a horizontal position with the box-like structure opposite the main entrance 14 until the weight of a bird is imposed within and on the box-like structure. As soon as the bird enters the box-like structure the weight of the bird causes the bar 20 to swing on the pivot and move the box-like structure downwardly to the doorway 12. During this movement of the box-like structure, it will be seen that the walls thereof cooperating with the walls 6 and 7 substantially confine the bird within a very limited area making it practically impossible for the bird to fly. The bird seeing the light within the cage through the opening 13' of the door will be attracted to the cage 33 and will force the door 13 open in order to reach the interior of the cage. As soon as the bird passes the door 13 the latter gravitates into a closed position and the box-like structure 18 due to the weight 22' returns to a position opposite the main entrance 14.

It will therefore be seen that the trigger mechanism is of the self-setting type and that as soon as a bird enters the cage it will automatically reset itself to receive another bird from the main entrance.

The bait chamber 17 may be supported in the opening of the wall 7 opposite the main entrance 14 in any conventional and well known manner and it is preferably of a construction that can be conveniently opened and closed in its wall portion directly opposite said entrance 14 to allow bait to be renewed therein when necessary.

By referring to Fig. 1 it will be seen that the major portion 34 of the wall 9 is enclosed and forms the bottom of the trigger chamber 11. The interior wall 7 does not extend at any place below the inclined portion 34 of the bottom wall 9, and the outer wall 6 which does in part extend below the inclined bottom 34 is provided with a sliding door 24 which may be conveniently opened to permit manual removal of the birds confined within the cage.

If desired, at least the upper portions of side walls 8 and 10, the upper portions of the front and interior walls 6 and 7 and the forward portion of top wall 30 may be formed of foraminous material to illuminate and ventilate the trigger chamber 11.

A trap of the character described will be highly efficient in the catching of birds or if desired may be employed for trapping small animals and may be manufactured and sold at a low cost due to its simplicity in construction and the minimum number of parts involved in the making thereof.

While I have shown and described the preferred embodiment of my invention, it will be understood that minor changes in construction, combination and arrangement of parts may be made without departing from the spirit and scope of the invention as claimed.

Having thus described my invention, what I claim is:

In a trap, a cage having front, rear, top, bottom and opposed side walls, an interior wall parallel to said front wall and spaced therefrom, said interior wall dividing said cage into a cage compartment and a trigger chamber, said trigger chamber having an upper end portion and a diagonally-opposite lower end portion, a floor for said chamber comprising an inclined major bottom portion extending downwardly from said upper end portion, and a shorter horizontal bottom portion defining one wall of said lower end portion, said trigger chamber being formed with an entrance in an upper portion of said front wall of said cage and a doorway formed in said interior wall below and out of direct vertical alignment with said entrance, said doorway providing communication between said trigger chamber and said cage compartment, a self-closing door for said doorway adapted to be opened by pressure of a bird trapped in said chamber, said cage compartment being formed with an access opening in a lower portion of said front wall below said inclined floor portion of said trigger chamber, a normally closed door for said access opening, said entrance to said trigger chamber having an outwardly-extending sill shelf, a bait chamber in said cage compartment in opposite relation to said entrance, a trigger bar pivotally mounted intermediate its ends in said trigger chamber, said trigger bar having an open-sided box-like structure mounted thereon at one side of its pivotal axis, and a counterweight normally maintaining said trigger bar yieldably in a horizontal position with said box-like structure interposed between said entrance and said bait chamber to provide a passage to the latter, said trigger bar being adapted to gravitate downwardly to position said box-like structure in alignment with said doorway under the weight of a bird entering said structure from said entrance, said bait chamber being visible through said entrance and box-like structure when the latter is in its normal position.

WELLINGTON C. HAIN.

REFERENCES CITED

The following references are of record in the file of this patent:

UNITED STATES PATENTS

| Number | Name | Date |
| --- | --- | --- |
| 471,726 | Watrous et al. | Mar. 29, 1892 |
| 473,967 | Shaffer | May 3, 1892 |
| 834,465 | Fine | Oct. 30, 1906 |
| 1,066,208 | King | July 1, 1913 |
| 1,347,407 | Rohlff | July 20, 1920 |
| 1,552,377 | Althousen | Sept. 1, 1925 |
| 2,273,008 | Fisher | Feb. 17, 1942 |
| 2,374,691 | Middleton | May 1, 1945 |